United States Patent
Kathol et al.

(10) Patent No.: US 10,436,325 B2
(45) Date of Patent: Oct. 8, 2019

(54) INTEGRATED SEAL BACKUP SYSTEM

(71) Applicant: KX Oil Tools Inc., Chestermere (CA)

(72) Inventors: Nathan Kathol, Chestermere (CA); Steve Kilshaw, Calgary (CA)

(*) Notice: Subject to any disclaimer, the term of this patent is extended or adjusted under 35 U.S.C. 154(b) by 0 days.

(21) Appl. No.: 15/617,890

(22) Filed: Jun. 8, 2017

(65) Prior Publication Data

US 2017/0356548 A1 Dec. 14, 2017

Related U.S. Application Data

(60) Provisional application No. 62/347,378, filed on Jun. 8, 2016.

(51) Int. Cl.
*F16J 15/10* (2006.01)
*F16J 15/00* (2006.01)
*F16J 15/06* (2006.01)

(52) U.S. Cl.
CPC .............. *F16J 15/008* (2013.01); *F16J 15/10* (2013.01); *F16J 15/061* (2013.01)

(58) Field of Classification Search
CPC .......... F16J 15/008; F16J 15/10; F16J 15/061; E21B 33/128; E21B 33/1216
See application file for complete search history.

(56) References Cited

U.S. PATENT DOCUMENTS

| | | | |
|---|---|---|---|
| 7,735,549 B1 * | 6/2010 | Nish | E21B 33/134 166/134 |
| 7,810,558 B2 | 10/2010 | Shkurti et al. | |
| 7,874,354 B2 | 1/2011 | Freyer | |
| 8,403,036 B2 | 3/2013 | Neer et al. | |
| 8,479,809 B2 | 7/2013 | Farquhar | |
| 8,701,787 B2 | 4/2014 | Shkurti et al. | |
| 8,839,874 B2 | 9/2014 | Bishop et al. | |
| 2004/0036225 A1 * | 2/2004 | Ritter | E21B 33/1208 277/328 |
| 2004/0177952 A1 * | 9/2004 | Turley | E21B 33/1208 166/134 |
| 2006/0232019 A1 | 10/2006 | Garrison et al. | |
| 2011/0101615 A1 | 5/2011 | Clarke | |
| 2013/0146277 A1 * | 6/2013 | Bishop | E21B 33/1216 166/118 |
| 2014/0262351 A1 | 9/2014 | Derby | |
| 2014/0290946 A1 | 10/2014 | Nguyen et al. | |
| 2016/0061000 A1 | 3/2016 | Rochen et al. | |
| 2018/0023366 A1 * | 1/2018 | Deng | E21B 33/1216 |

* cited by examiner

*Primary Examiner* — Gilbert Y Lee
(74) *Attorney, Agent, or Firm* — Bennett Jones LLP

(57) ABSTRACT

An integrated seal backup system includes a guiding mandrel; opposing taper elements; a deformable element positioned around the mandrel and between the taper elements; opposing sets of rings adjacent the deformable element, each set having an inner solid ring having an outer diameter smaller than an inside diameter of the tubular to be sealed and at least one backup ring having an inner taper matching the taper element and adapted to fracture in a pre-determined location in response to a diameter expanding force.

8 Claims, 2 Drawing Sheets

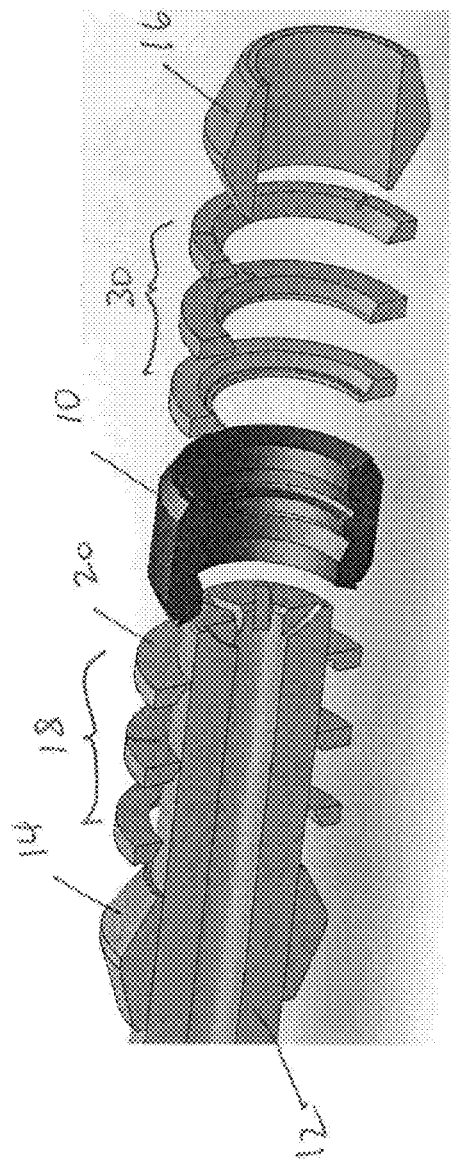
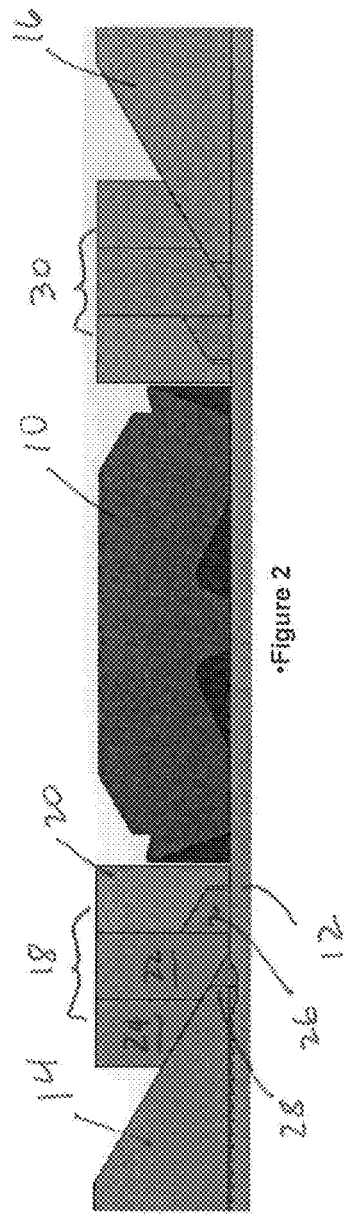

INTEGRATED SEAL BACKUP SYSTEM

FIELD OF THE INVENTION

The present invention relates to an integrated seal backup system.

BACKGROUND

In the drilling, reworking or production of oil wells, it is often desirable to seal tubing or other pipe in the casing of the well, such as when pumping cement or other fluids down the tubing and force the cement or fluid around the annulus of the tubing or out into a formation. It then becomes necessary to seal the tubing with respect to the well casing and to prevent the fluid pressure of the slurry from lifting the tubing out of the well or for otherwise isolating specific zones in a well. Downhole tools referred to as packers and bridge plugs are designed for these general purposes and are well known in the art.

Packers and bridge plugs frequently use a deformable element such as an elastomeric seal to seal annular areas between concentric tubulars. Unwanted extrusion of such seals is a well known problem for which many solutions have been proposed. There is a need in the art for additional alternatives to prevent unwanted extrusion of such seals.

SUMMARY OF THE INVENTION

In one aspect, the invention may comprise an integrated seal backup system comprising:
(a) a guiding mandrel;
(b) a first taper element;
(c) a deformable element positioned around the mandrel and adjacent the taper element; and
(d) a first set of rings disposed between the taper element and the deformable element, comprising an inner solid ring having an outer diameter smaller than an inside diameter of the tubular to be sealed and at least one backup ring having an inner taper matching the taper element and adapted to fracture in a pre-determined location in response to a diameter expanding force.

The at least one backup ring may be fractured into a C-ring, and expands in diameter while abutting the adjacent inner solid ring, when the first taper element is moved underneath the at least one backup ring and the deformable element is deformed into its sealing shape.

In one embodiment, there are at least two backup rings.

Preferably, the system further comprises a second taper element and a second set of rings disposed between the second taper element and the deformable element, comprising an inner solid ring having an outer diameter smaller than an inside diameter of the tubular to be sealed and at least one backup ring having an inner taper matching the second taper element and adapted to fracture in a pre-determined location in response to a diameter expanding force.

Preferably, each of the first and second sets of rings comprises two or more backup rings, wherein adjacent backup rings are adapted to fracture in non-aligned locations.

In another aspect, the invention may comprise a method of placing a seal within a tubular, comprising the steps of:
(a) placing a sealing system within the tubular, the system including a guiding mandrel, a first taper element, a deformable element positioned around the mandrel and between the first taper element; a first set of rings disposed between the first taper element and the deformable element, comprising a first inner solid ring having an outer diameter smaller than an inside diameter of the tubular to be sealed and a first at least one backup ring having an inner taper matching the first taper element and adapted to fracture in a pre-determined location in response to a diameter expanding force;
(b) fracturing the first at least one backup ring by advancing the first taper element, such that the at least one backup ring contacts the inner surface of the tubular, adjacent the inner solid ring; and
(c) deforming the deformable element into a space between an inner surface of the tubular, the first inner solid ring and the first fractured at least one backup ring.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

FIG. 1 is an exploded view of one embodiment of the invention, showing the parts of the seal backup assembly prior to assembly.

FIG. 2 shows a cross-section of the assembly of FIG. 1, prior to compression.

DETAILED DESCRIPTION

Figure 3:
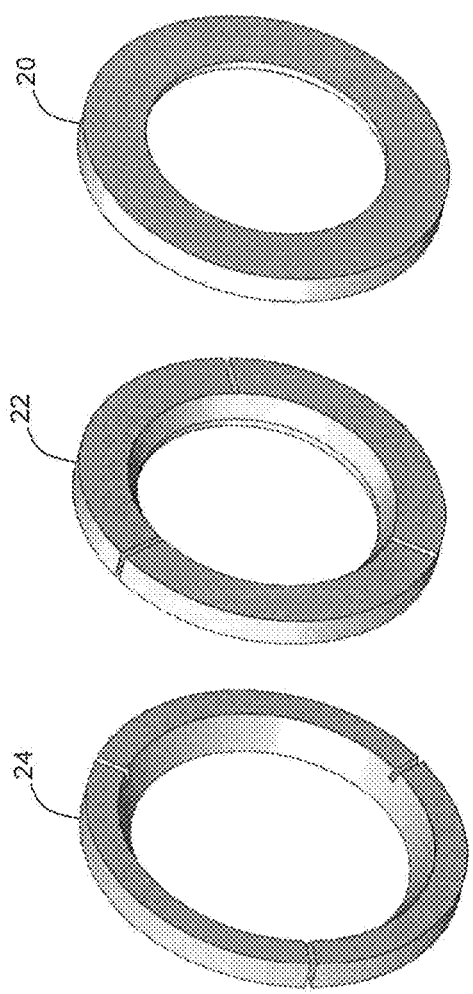
FIG. 3 shows one embodiment of the multiple rings of the invention.

The invention relates to an integrated seal backup system, one embodiment of which is shown in the Figures. The system is used to provide a seal against the inside surface of a tubular (T), by axially compressing a deformable element (10) which expands radially. Rings backup and restrain the deformable element to prevent unwanted extrusion.

The deformable element (10) is positioned around a guiding mandrel (12), as is well known in the art. The deformable element may be conventionally formed from an elastomer. In one embodiment, a first taper element (14) and a second taper element (16) are also positioned on the mandrel and are moveable axially along the guiding mandrel (12), towards or away from each other.

A first set of rings (18) are disposed between the first taper element (14) and the deformable element (10) and includes an inner solid ring (20) which bears on the deformable element (10) and has an outer diameter smaller than an inside diameter of the tubular (T) to be sealed, an adjacent middle backup ring (22) and an end backup ring (24). The backup rings (22, 24) preferably have an outer diameter the same as the inner solid ring (20), and engage the first taper element. Preferably, each back up ring has an inner taper which has a slope which matches the slope of first taper element (14). In one embodiment, the inner solid ring defines an inner groove (26) which receives the toe end (28) of the first taper element (14) when it is in a compressed position.

Each backup ring is adapted to fracture, preferably in a pre-determined location, in response to a diameter expanding force, such as by notching the ring with a groove, or otherwise weakening the ring in the desired location.

In one embodiment, when the system is assembled, the weak points or notches of adjacent backup rings are oriented in such a manner that the notches are not aligned, preferably equally spaced in relation to the adjacent ring. The depth of each notch may be controlled to stage the loading at which the ring splits, or to control which ring splits first.

The second taper element and the second set of rings (30) preferably mirror the configuration of the first taper element and the first set of rings. With the backup ring stacks (18, 30) on both sides of the deformable element (10), complete isolation and/or containment can be achieved. Alternatively, if a unidirectional backup is desired, a backup ring assembly (18) may be positioned on one side of the sealing member (10) only.

Figure 4:
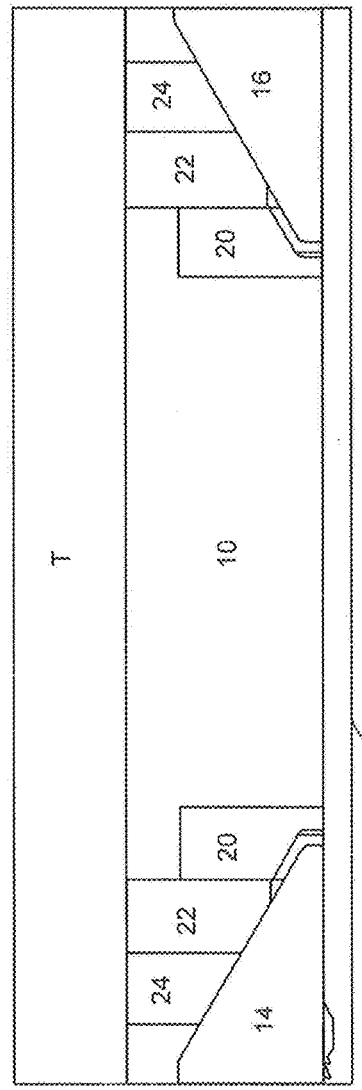
FIG. 4 shows the cross-section of FIG. 2, after compression.

As shown in FIG. 3, in one embodiment, each backup ring is notched in 3 places, equally spaced around the ring, none of which are axially aligned with the notches of an adjacent backup ring. When one or both of the taper elements (14, 16) are actuated to move closer together, the taper elements drive under the backup rings (22, 24), causing the backup rings to fracture at a notch, and each become a C-ring. Each backup ring then travels along the taper element and expands radially outward to the inner wall of the tubular (T) to be sealed. The toe end (28) of the taper element (14) fits into the inner groove of the inner solid ring (20), and urges the ring (20) against the deformable element (10), deforming it outwards. As may be seen in FIG. 4, the inner solid rings compress the deformable element between them, deforming the element radially outwards and against the tubular (T). As the inner solid ring (20) maintain a constant diameter, a gap forms between the tubular (T), the inner solid ring and the middle backup ring (22). The deformable element (10) fills into that gap, but is otherwise constrained.

Depending on the seal required, any number of backup rings can be used in conjunction with different slots cuts as well. These components can be manufactured from any suitable material, such as carbon steel, chrome, a composite material, or degradable materials or plastics. Dissolvable bridge plugs may be formed using dissolvable metal.

It is possible, that with correct ring material selection, and ring and taper geometry, that the backup ring system may be used as a pressure isolation seal stack.

Definitions and Interpretation

The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. Embodiments were chosen and described in order to best explain the principles of the invention and the practical application, and to enable others of ordinary skill in the art to understand the invention for various embodiments with various modifications as are suited to the particular use contemplated.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such aspect, feature, structure, or characteristic with other embodiments, whether or not explicitly described. In other words, any element or feature may be combined with any other element or feature in different embodiments, unless there is an obvious or inherent incompatibility between the two, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

What is claimed is:

1. An integrated seal backup system comprising:
    (a) a guiding mandrel;
    (b) a first taper element;
    (c) a deformable element positioned around the mandrel;
    (d) a first set of rings disposed between the taper element and the deformable element, comprising an inner solid ring adjacent the deformable element and having an outer diameter smaller than an inside diameter of the tubular to be sealed and at least one backup ring adjacent the inner solid ring and engaging the taper element and adapted to fracture in a pre-determined location in response to a diameter expanding force.

2. The system of claim 1 wherein the first set of rings comprises two or more backup rings, wherein adjacent backup rings are adapted to fracture in non-aligned locations.

3. The system of claim 2 further comprising a second taper element disposed on a side of the deformable element opposing the first taper element, and a second set of rings disposed between the second taper element and the deformable element, comprising a second inner solid ring adjacent the deformable element and having an outer diameter smaller than an inside diameter of the tubular to be sealed and a second at least one backup ring adjacent the second inner solid ring and engaging the taper element and adapted to fracture in a pre-determined location in response to a diameter expanding force.

4. The system of claim 3 adapted to be actuated into a sealing configuration wherein the deformable element is compressed between the first and second inner solid rings and the tubular and into the gap between the first inner solid ring and the tubular and a second gap between the second inner solid ring and the tubular, abutting the fractured first and second at least one backup rings, which is being urged against the tubular and the first or second inner solid rings by the first or second taper elements, respectively.

5. The system of claim 1 wherein the inner solid ring is configured to receive a toe end of the first taper element.

6. The system of claim 1 adapted to be actuated into a sealing configuration wherein the deformable element is compressed against the inner solid ring and the tubular and into a gap between the inner solid ring and the tubular abutting a fractured at least one backup ring, which is being urged against the tubular and the inner solid ring by the first taper element.

7. A method of placing a seal within a tubular, comprising the steps of:
   (a) placing a sealing system within the tubular, the system including a guiding mandrel, a first taper element, a deformable element positioned around the mandrel and between the first taper element; a first set of rings disposed between the first taper element and the deformable element, comprising a first inner solid ring having an outer diameter smaller than an inside diameter of the tubular to be sealed and a first at least one backup ring having an inner taper matching the first taper element and adapted to fracture in a pre-determined location in response to a diameter expanding force;
   (b) fracturing the first at least one backup ring by advancing the first taper element, such that the at least one backup ring contacts the inner surface of the tubular, adjacent the inner solid ring; and
   (c) deforming the deformable element into a space between an inner surface of the tubular, the first inner solid ring and the first fractured at least one backup ring.

8. The method of claim 7 wherein the sealing system further comprises a second taper element disposed on a side of the deformable element opposing the first taper element, and a second set of rings disposed between the second taper element and the deformable element, comprising a second inner solid ring adjacent the deformable element and having an outer diameter smaller than an inside diameter of the tubular to be sealed and a second at least one backup ring adjacent the second inner solid ring and engaging the taper element and adapted to fracture in a pre-determined location in response to a diameter expanding force, and wherein the deformable element is deformed into a space between an inner surface of the tubular, the first inner solid ring, the second inner solid ring, the fractured first at least one backup ring and the fractured second at least one backup ring.

* * * * *